Feb. 16, 1954     C. C. CUTLER     2,669,657
ELECTROMAGNETIC LENS

Filed Nov. 19, 1949     3 Sheets-Sheet 1

INVENTOR
C. C. CUTLER
BY
A. J. Zerbarini
ATTORNEY

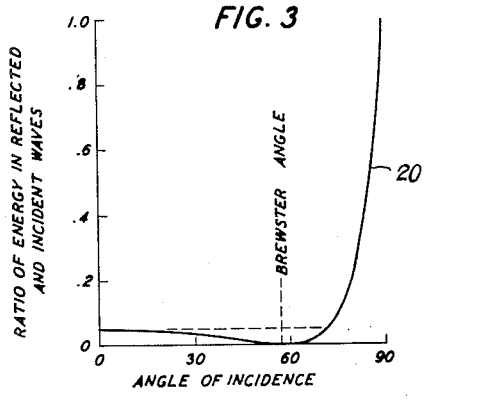
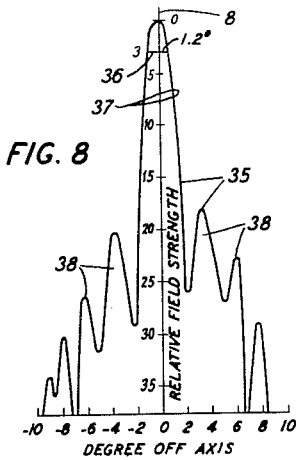
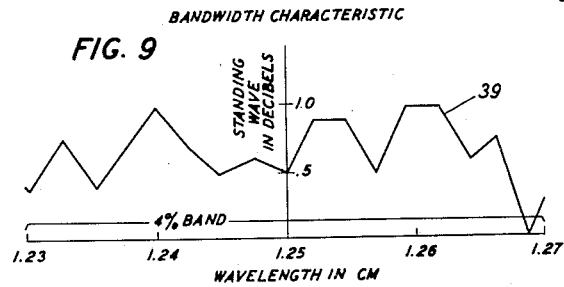
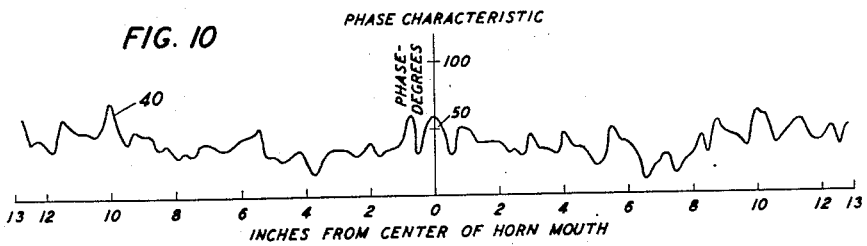
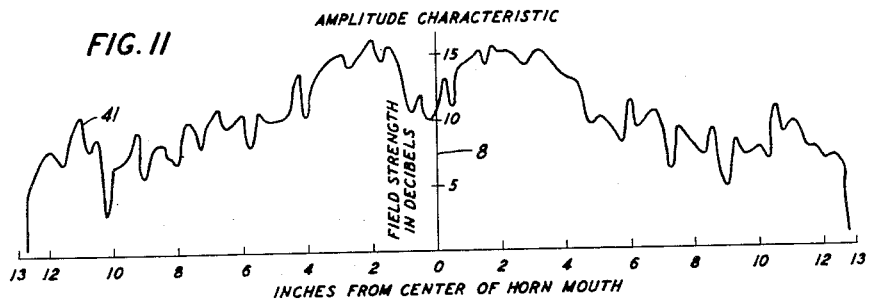

Feb. 16, 1954  C. C. CUTLER  2,669,657
ELECTROMAGNETIC LENS
Filed Nov. 19, 1949  3 Sheets-Sheet 3

INVENTOR
C. C. CUTLER
BY
A. J. Zerbarini
ATTORNEY

Patented Feb. 16, 1954

2,669,657

UNITED STATES PATENT OFFICE 2,669,657

ELECTROMAGNETIC LENS

Cassius C. Cutler, Gillette, N. J., assignor to Bell Telephone Laboratories, Incorporated, New York, N. Y., a corporation of New York Application November 19, 1949, Serial No. 128,338

2 Claims. (Cl. 250—33.63)

This invention relates to electromagnetic refractors and particularly to methods and means for preventing reflection from the face or surface of such refractors.

As is known, considering a ray or wavelet impinging upon the face of a lens and polarized in the plane of incidence, zero surface reflection occurs when the "incidence angle," that is, the angle between the path of the ray and the normal to the lens face at the point of impingement of the ray, is equal to the so-called pseudo-Brewster angle, and minimum reflection occurs when the incident angle is smaller than the pseudo-Brewster angle. In general, the incident angle is dependent upon the curvature of the convex or concave lens face and, assuming the waves are emitted at the focal point or focal line of the lens, it is also a function of the lens focal length. Also, the reflection from the central or vertex portion of the concave or convex lens is usually relatively small since the incident angles are usually smaller than the pseudo-Brewster angle. On the other hand, the amount of reflection from the peripheral portion of the lens face may not be small because of the large incident angles. Accordingly, it appears desirable to obtain a lens having a curvature such that for waves emitted at the focus, all incident angles are preferably smaller or, in any event, only slightly larger than the pseudo-Brewster angle whereby surface reflection is reduced to a minimum.

It is one object of this invention to eliminate reflection from a face of a refractor.

It is another object of this invention to minimize reflection from a solid dielectric or a metallic lens having a short focal line.

It is still another object of this invention to minimize reflection from the peripheral portion of a curvate lens face.

In accordance with one embodiment of the invention, the outer or peripheral portion of the curvate back face of a delay lens having a short focal length has a concave curvature such that, at every point on this face portion, the incident angles are equal to or smaller than the pseudo-Brewster angle, whereby reflection from this face portion is a minimum. The central portion of the aforesaid face is convex and reflection is a minimum since the various incident angles are smaller than the related pseudo-Brewster angles. The contour of the opposite or front face is convex and correlated with the curvature of the back face to produce the desired focusing effect.

The invention will be more fully understood from the following specification taken in conjunction with the drawing on which like reference characters denote elements of similar function and on which:

Fig. 3 is a curve illustrating the reflection-angle characteristic of polystyrene;

Figs. 8, 9, 10 and 11 are curves illustrating four different characteristics for a system constructed in accordance with Figs. 5 and 6.

Figure 1:
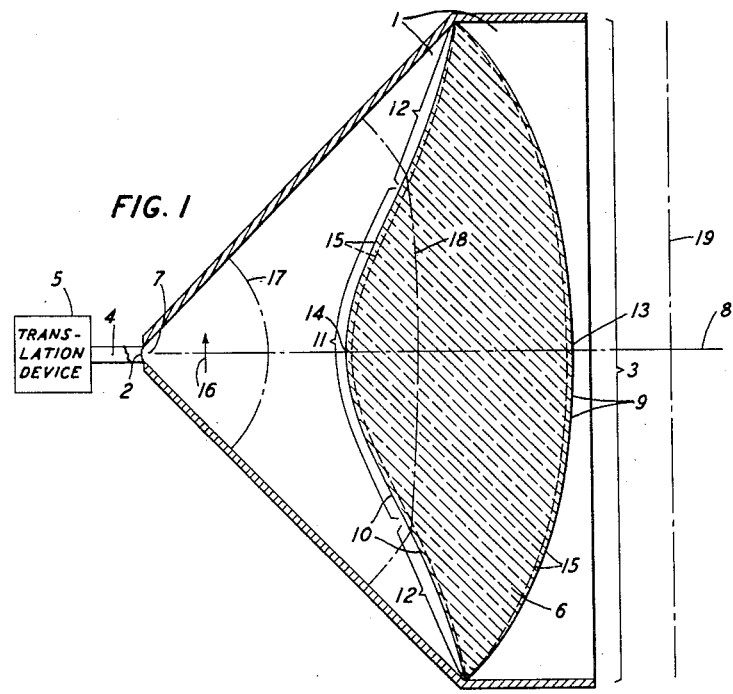
Fig. 1 is a top sectional view and Fig. 2 is a side sectional view of one embodiment of the invention.
Figure 2:
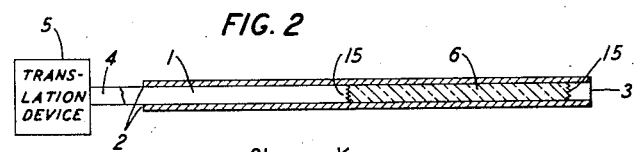

Referring to Figs. 1 and 2, there is shown a microwave radio system comprising a sectoral horn having a throat 2 and a mouth 3, a wave guide 4 connecting the throat 2 to a translation device 5, such as a transmitter, a receiver or a transceiver, and a polystyrene lens 6 mounted in the mouth of the horn. The lens 6 has a line focus 7, an axis 8, a convex front face 9 and a back face 10 having a convex central or vertex portion 11 and a concave outer or peripheral portion 12. The manner of determining the curvatures of the front and back faces is explained below. The numerals 13 and 14 denote, respectively, the vertices of the front and back faces 9 and 10. Four matching grooves 15, each a quarter wavelength deep, are provided on the front and back faces 9 and 10 of the lens 6. The matching grooves per se are not essential and do not form a part of the present invention.

In transmitting operation, waves polarized as shown by arrow 16 are supplied by the transmitting device 5 to the guide 4 and horn throat 2, and a cylindrical wave front 17 is established in the horn 1. The cylindrical wave front 17 impinges on the back face 10 of the lens 6 and, as is now well understood in the art, the matching grooves 15 function to reduce a certain amount of the reflection from the back face 10. In passing through the lens 6, the phase velocity of the wave is retarded as shown by the dot-dash line 18 an amount such that the outgoing wave has a plane wave front 19.

In determining the curvatures of the front and back faces of the lens, the curvature of the back face is first ascertained and the contour of the front face is calculated to give uniform phase on a plane, that is, to produce a plane outgoing wave front. As already stated, the incident angles at the back face should be small enough to reduce reflection. For waves polarized parallel to the vertical plane of incidence the angles of incidence should not be much greater, and preferably equal to or somewhat smaller, than the pseudo-Brewster angle for the particular refractive medium utilized; and for waves polarized perpendicular to the vertical plane of incidence, they should be even smaller.

Referring to Fig. 3, the curve 20 illustrates, for polystyrene, the relation between the incident wave angle and the ratio of the energies in the reflected and incident waves. As shown by curve 20, for polystyrene the angle of zero reflection, or the so-called pseudo-Brewster angle, is 57 degrees. Hence, in the embodiment of the Figs. 1, and 2, the peripheral portion of the back face should be shaped so as to render the incident angles equal to 57 degrees, whereby zero reflection occurs or, in any event, it should be shaped so as to render the incident angles smaller than 71 degrees whereby minimum reflection, corresponding to an 0.05 ratio or less, is obtained. In reception, the converse operation is secured, that is, an incoming plane wave front is converted to a cylindrical wave front converging on the focal line 7. The matching grooves 15 on the front face 9 function to reduce the reflection of the incoming wave a given amount, in a manner analogous to the grooves 15 on the back face 10.

In designing the lens of Figs. 1 and 2, the general configuration of the lens, such as convexo-convex is first determined. Also, referring to Fig. 4, the distance $d_2$ from the source or focus 7 to the vertex 14 of the back face 10, and the maximum or axial thickness $t_0$ of the lens are selected. In general, in determining the contours of the back and front faces, sharp curvatures should be avoided.

$$n = \frac{v_1}{v_2} \quad (1)$$

where $n$ is the index of reflection for the lens 6,
$v_1$ is the phase velocity in the horn 1,
$v_2$ is the phase velocity in the lens 6.

For transverse electric (TE$_{01}$) waves such as waves having the polarization 16, we have $$n = \frac{\frac{1}{\sqrt{\frac{\epsilon_1}{\lambda_a^2} - \frac{1}{\lambda_{c_1}^2}}}}{\frac{1}{\sqrt{\frac{\epsilon_2}{\lambda_a^2} - \frac{1}{\lambda_{c_2}^2}}}} = \sqrt{\frac{\epsilon_2 \lambda_{c_2}^2 - \lambda_a^2}{\epsilon_1 \lambda_{c_1}^2 - \lambda_a^2}} \quad (2)$$

where $\lambda_{c_1}$ is the cut-off wavelength in the horn,
$\lambda_{c_2}$ is the cut-off wavelength in the lens,
$\lambda_a$ is the air, or free space, wavelength,
$\epsilon_1$ is the dielectric constant of the lens,
$\epsilon_2$ is the effective dielectric constant of the horn and differs from unity.

Now, in order to render the longest path $d_2$ and the shortest path $d_1$ equal, we have $$t_0 = \frac{d_2 - d_1}{n - 1} \quad (3)$$

where $t_0$ is the maximum thickness of the lens. Accordingly, $$d_3 = d_1 - t_0 \quad (4)$$

where $d_3$ is the distance from the line focus 7 to the vertex 14. Hence, the position of the vertex 14 relative to the focus 7 may be determined.

The curvature of the vertex portion of the back face 10 should not be so great as to cause a convergence of the rays within the lens, that is $$R \geq d_3(n-1) \quad (5)$$

With the limitations on the contour of the back face 10 as given above, three points on the curvature, to wit, the vertex point 14, the extreme or peripheral point 21 and an intermediate point 22, may be ascertained from the following quadratic $$r_1 = a + b\theta_1^2 + c\theta_1^4 \quad (6)$$

where $r_1$ is the distance from the focal line 7 to the intermediate point 22,
$\theta_1$ is the angle between the axis 8 and the line 23 connecting the focus 7 and the intermediate point 22,
$a$, $b$ and $c$ are constants.

With the above three points determined, additional points may be plotted as desired in order to verify that the radius of curvature is not smaller than R and that the incident angles adjacent to the periphery are not materially larger than the pseudo-Brewster angle. Usually one adjustment of the point 22, or distance $r_1$, will be sufficient to obtain the desired contour, but it may be necessary either to add a sixth power term in the above quadratic or reconsider the over-all shape.

With the contour of the back face 10 determined, the contour of the front face 9 is next ascertained. Thus $$\sigma = \tan^{-1} \frac{1}{r_1} \frac{dr_1}{d\theta_1} \quad (7)$$

$$= \tan^{-1} \frac{2b\theta_1 + 4C\theta_1^3}{a + b\theta_1^2 + C\theta_1^4} \quad (8)$$

where $\sigma$ is the incident angle at point 22, that is, the angle between the normal 24 at point 22 and the incident direction 23. Now $$\rho = \sin^{-1} \left(\frac{1}{n} \sin \sigma\right) \quad (9)$$

where $\rho$ is the angle of refraction, and $$\theta_2 = \theta_1 - \sigma + \rho \quad (10)$$

where $\theta_2$ is the angle between the direction 25 of the refracted wave and the axis 8.

For a wavelet following the directions 23 and 25, the total phase shift from the focal line 7 through the lens 6 to the outgoing plane front 19 is $$\Phi = (r_1 + nr_2 + r_3) \frac{2\pi}{\lambda_1} \quad (11)$$

where $\lambda_1$ is the wavelength in the horn, as measured outside of the lens,
$\pi$ equals 3.14,
$\Phi$ is the phase shift in degrees.

Figure 4:
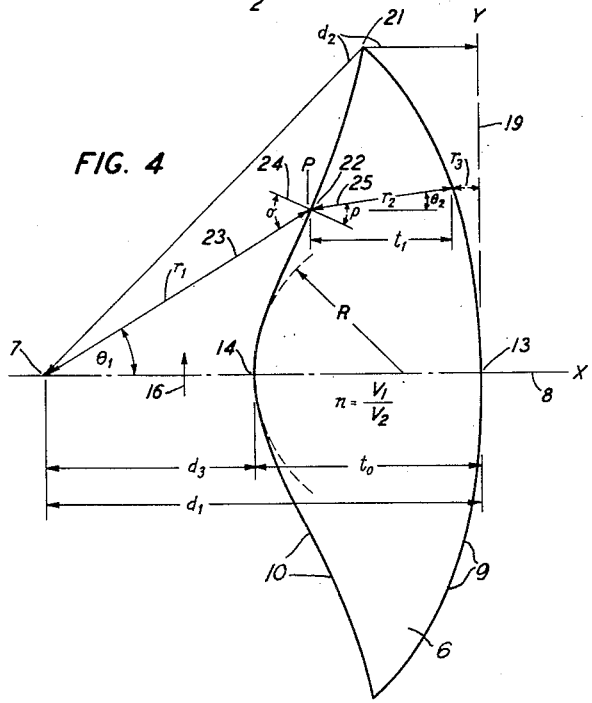
Fig. 4 is a diagram used in explaining the manner of determining the front and back curvatures of the lens illustrated in Fig. 1.

Also, from Fig. 4 we have $$r_3 = d_1 - r_1 \cos \theta_1 - r_2 \cos \theta_2 \quad (12)$$

Hence, $$\Phi = [d_1 + r_1[1 - \cos \theta_1] + r_2[n - \cos \theta_2]] \frac{2\pi}{\lambda_1} \quad (13)$$

For a plane wave front parallel to 19 we have $$r_2 = \frac{d_2 - d_1 - r_1[1 - \cos\theta_1]}{n - \cos\theta_2} \quad (14)$$

With $r_2$ determined, the contour of the back face may be obtained in rectangular coordinates from the following equations, the origin being at the focal line 7.

$$X = r_1 \cos\theta_1 + r_2 \cos\theta_2 \quad (15)$$
$$Y = r_1 \sin\theta_1 + r_2 \sin\theta_2 \quad (16)$$

Figure 5:
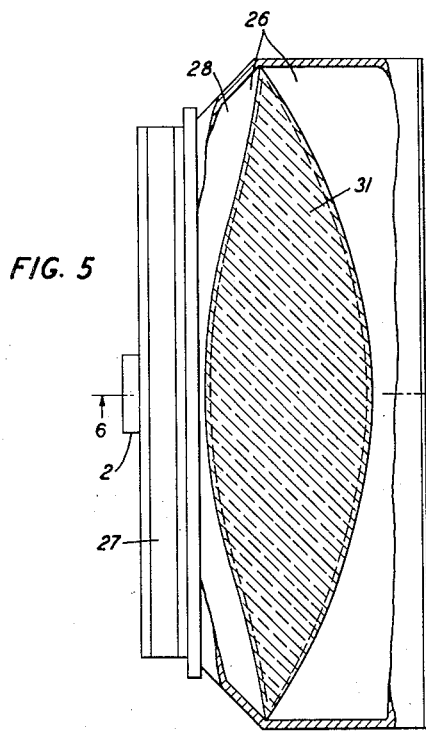
Fig. 5 is a top sectional view and Fig. 6 a side sectional view of a different embodiment of the invention.
Figure 6:
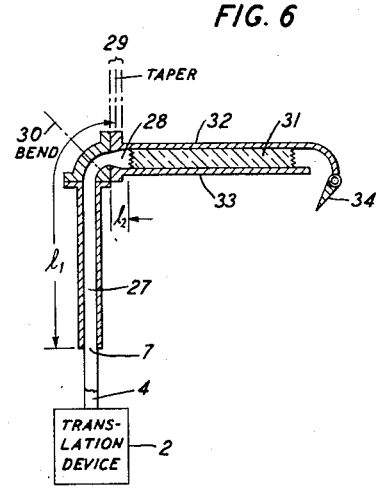

Referring now to Figs. 5 and 6, the radio system illustrated is similar to that illustrated by Figs. 1 and 2. More particularly, there is shown a sectoral horn 26 comprising a vertical parallel plate section 27 having a tapered width, a horizontal parallel plate section 28 having a tapered width and a short section 29 having a tapered width and a tapered height or plate separation and connected to the horizontal section. A 90-degree section 30 is coupled to the vertical section 27 and the short tapered section 29. The plate separation of section 28 is greater than that of sections 27 or 30. Numeral 31 denotes a lens formed of polystyrene and positioned in the horizontal horn section 28. As shown on the drawing, the upper plate or wall 32 of the horizontal horn section extends beyond the lower wall 33 and is bent or curved so that the horn mouth faces downwardly. Numeral 34 denotes a movable flare member attached to the upper wall 32. The operation of this system of Figs. 5 and 6 is substantially the same as that of the system illustrated by Figs. 1 and 2.

Figure 7:
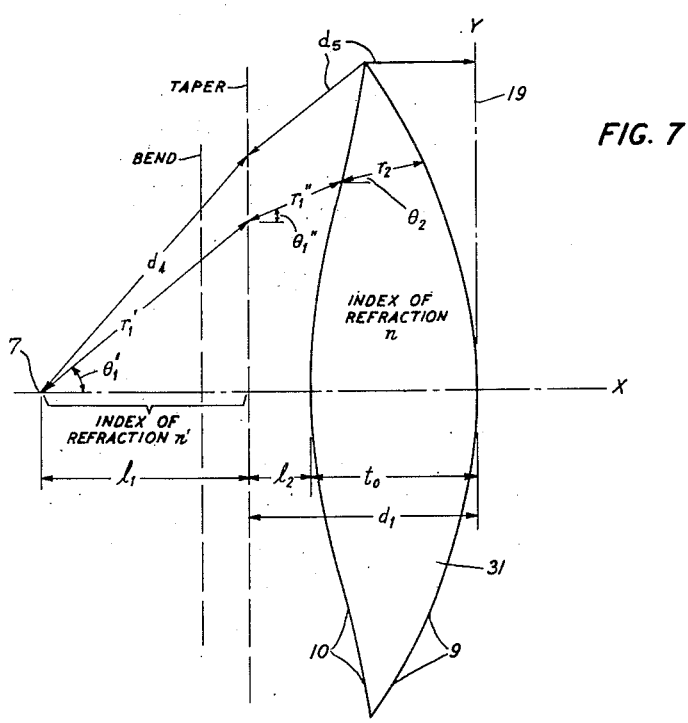
Fig. 7 is a developed diagram used for explaining the manner of determining the curvatures of the lens illustrated in Fig. 5.

The contours of the front and back faces of the lens differ from the contours of lens 6, Figs. 1 and 2, because the short tapered section 29 must be considered as a surface or boundary between two media 28 and 30 (27) having different indices of refraction. Thus if the ratio of the refractive indices of 27 and 26 (Fig. 7) is $n'$, $$n' = \frac{v'}{v''} \quad (17)$$

and $$r_1 = n' r_1' + r_1'' \quad (18)$$

where $r_1'$ is the distance measured along a ray to a point in the taper 26, and
$r_1''$ is the distance along the same ray measured to the lens face 10.

Also, $$\frac{\sin\theta_1''}{\sin\theta_1'} = n' \quad (19)$$

where $\theta_1'$ and $\theta_1''$ are the ray angles in 27 and 26 respectively. Now $$r_1' = \frac{l_1}{\cos\theta_1'} \quad (20)$$

and therefore $$r_1 = \frac{n' l_1}{\cos\theta_1'} + r_1'' \quad (21)$$

and $$\theta_1'' = \sin^{-1}(n' \sin\theta_1') \quad (22)$$

Now it is again desirable that the first lens surface not cause beam convergence, that is, $$R \geq \left(l_2 + \frac{l_1}{n'}\right)(n-1) \quad (23)$$

With this limitation and the limitation that the angle of incidence should not greatly exceed the pseudo-Brewster angle, we can proceed to determine the first lens surface. More specifically, let $r_1''$ be a simple even order polynominal function of $\theta_1''$, $$r_1 = a + b\theta_1''^2 + c\theta_1''^4$$

and use three arbitrarily selected points to determine the values of the constants. Proceeding as before we have:

$$\sigma = \tan^{-1} \frac{2b\theta_1'' + 4c\theta_1''^3}{a + b\theta_1''^2 + c\theta_1''^4} \quad (24)$$

$$\rho = \sin^{-1} \frac{1}{n} \sin\sigma \quad (25)$$

$$\theta_2 = \theta_1'' + \sigma + \rho \quad (26)$$

$$r_2 = \frac{n' d_4 + d_3 - d_1 - l_1 - r_1'(n' - \cos\theta_1') - r_1''(1 - \cos\theta_1'')}{n - \cos\theta_2} \quad (27)$$

$$X_2 = r_1' \cos\theta_1' + r_1'' \cos\theta_1'' + r_2 \cos\theta_2 \quad (28)$$

$$Y_2 = r_1' \sin\theta_1' + r_1'' \sin\theta_1'' + r_2 \sin\theta_2 \quad (29)$$

Referring to Figs. 8, 9, 10 and 11, Fig. 8 illustrates the measured directive pattern or characteristic, Fig. 9 illustrates the measured band width characteristic, Fig. 10 the measured phase characteristic, and Fig. 11 the measured amplitude characteristic, of an antenna constructed in accordance with Figs. 5 and 6 and with the long dimensions of the horn mouth twenty-six inches. Directive pattern 35, Fig. 8, taken in the plane of the long dimension of the horn mouth 3, is highly satisfactory since the half power width 36 at 3 decibels down of the major lobe 37 is approximately 1.2 degrees and the minor lobes 38 are more than 18 decibels below the peak of the major lobe. As shown by the curve 39, Fig. 9, the horn antenna of Figs. 5 and 6 is highly useful over a four-per cent frequency band since the measured standing wave ratio in the guide 4 is between 0.5 and 1.0 decibel. In addition the phase and amplitude characteristics are satisfactory since the phase curve 40, Fig. 10, and the amplitude curve 41, Fig. 11, are fairly flat over the long dimension of the horn mouth.

Although the invention has been explained in connection with said embodiments thereof, it is to be understood that it is not to be limited to these embodiments inasmuch as other apparatus may be successfully employed in practicing the invention. In particular, while the invention has been explained in connection with a solid dielectric delay lens, it may be satisfactorily used in plano-concave metallic fast lenses of the type disclosed in the copending application of W. E. Kock Serial No. 642,723, filed January 6, 1946, and in the plano-convex slow or delay lens of the type disclosed in the copending application of W. E. Kock Serial No. 748,447, filed May 16, 1947, which last-mentioned application matured into United States Patent 2,579,324, granted December 18, 1951.

What is claimed is:

1. A dielectric lens for use within the mouth aperture of a high frequency, electromagnetic wave, waveguide, sectoral horn, said lens being assembled within said horn mouth aperture and having a line focus in the throat aperture of said horn and a longitudinal axis coincident with the longitudinal axis of said horn and perpendicularly bisecting said focal line, said axes being situated on the median plane parallel to and midway between the parallel sides of said sectoral horn, said lens converting high frequency electromagnetic wave energy, radiated into said horn at said throat aperture, into a plane wavefront wave at the mouth aperture of said horn, the maximum thickness of the lens, from its surface nearer said focal line to its surface more remote from said focal line, measured along the longitudinal axis of said lens, being $$t_0 = \frac{d_2 - d_1}{n - 1}$$

where $d_1$ is the shortest path from the focal line through the lens to the plane wavefront at the far side of the lens, $d_2$ is the longest path in said median plane from the focal line through the lens to the plane wavefront at the far side of the lens and $n$ is the ratio of the phase velocity of said energy in the horn to the phase velocity in the lens, the curvature about the vertex of the nearer surface of the lens being not greater than $d_3(n-1)$, where $d_3$ is the difference between the parameters $d_1$ and $t_0$ as defined above, and $n$ is the ratio defined above, the contour of the surface of the lens nearer said focal line in said median plane being defined by the quadratic $r_1 = a + b\theta_1^2 + c\theta_1^4$, where $r_1$ is the distance in said median plane from the focal line to a particular point selected on said nearer surface intermediate said shortest and said longest paths, $\theta_1$ is the angle between the longitudinal axis of the lens and the line joining said focal line and the selected point, and $a$, $b$ and $c$ are constants obtained by solutions of the said quadratic for the three energy paths from said focal line to said plane wavefront as described above, the X and Y coordinates in said median plane of any point on the said far surface of said lens being defined, with respect to an origin at the intersection of the focal line and the longitudinal axis of the lens, by the equations $X = r_1 \cos \theta_1 + r_2 \cos \theta_2$ and $Y = r_1 \sin \theta_1 + r_2 \sin \theta_2$ where $r_1$ and $\theta_1$ are as defined above, $r_2$ is the path in the lens followed by energy passing through point X, Y, and is defined by the equation $$r_2 = \frac{d_2 - d_1 - r_1(1 - \cos \theta_1)}{n - \cos \theta_2}$$

and $\theta_2$ is the angle of $r_2$ with respect to the longitudinal axis of the lens, the parameters $d_1$, $d_2$, $n$, $r_1$, and $\theta_1$, being as defined above.

2. A dielectric lens, having a focal point on the longitudinal axis of said lens, for use with high frequency electromagnetic wave energy and adapted to convert circular wavefront energy originating at said focal point and directed toward the nearer surface of said lens into plane wavefront energy at the more remote or far side of said lens, the maximum thickness between the nearer and the more remote surfaces of said lens, measured along its longitudinal axis, being $$t_0 = \frac{d_2 - d_1}{n - 1}$$

where $d_1$ is the shortest path from the focal point through the lens to the plane wavefront at the far side of the lens, $d_2$ is the longest path from the focal point through the lens to the plane wavefront and $n$ is the ratio of the phase velocity of the energy outside the lens to the phase velocity of the energy in the lens, the curvature about the vertex of the nearer surface of the lens being not greater than $d_3(n-1)$, where $d_3$ is the difference between the parameters $d_1$ and $t_0$ as defined above, and $n$ is the ratio defined above, the contour of the surface of the lens nearer said focal point being defined by the quadratic $$r_1 = a + b\theta_1^2 + c\theta_1^4$$

where $r_1$ is the distance from the focal point to a particular point selected on said nearer surface intermediate said shortest and said longest paths, $\theta_1$ is the angle between the longitudinal axis of the lens and the line joining said focal point and the selected point, and $a$, $b$ and $c$ are constants obtained by solution of the said quadratic for the three energy paths from said focal point to said plane wavefront as described above, the X and Y coordinates of any point on the said far surface of said lens being defined with respect to an origin at the focal point, by the equations $$X = r_1 \cos \theta_1 + r_2 \sin \theta_2$$

and $$Y = r_1 \sin \theta_1 + r_2 \sin \theta_2$$

where $r_1$ and $\theta_1$ are as defined above, $r_2$ is the path in the lens followed by energy passing through point X, Y, and is defined by the equation $$r_2 = \frac{d_2 - d_1 - r_1(1 - \cos \theta_1)}{n - \cos \theta_2}$$

and $\theta_2$ is the angle of $r_2$ with respect to the longitudinal axis of the lens, the parameters $d_1$, $d_2$, $n$, $r_1$, and $\theta_1$, being as defined above.

CASSIUS C. CUTLER.

References Cited in the file of this patent

UNITED STATES PATENTS

| Number | Name | Date |
| --- | --- | --- |
| 934,579 | Straubel | Sept. 21, 1909 |
| 2,273,447 | Ohl | Feb. 17, 1942 |
| 2,332,930 | Rinia | Oct. 26, 1943 |
| 2,398,095 | Katzin | Apr. 9, 1946 |
| 2,415,352 | Iams | Feb. 4, 1947 |
| 2,438,343 | McClellan | Mar. 23, 1948 |
| 2,479,673 | Devore | Aug. 23, 1949 |
| 2,479,907 | Cox | Aug. 23, 1949 |
| 2,501,658 | Barrow | Mar. 28, 1950 |
| 2,547,416 | Skellet | Apr. 3, 1951 |

OTHER REFERENCES

"Metal Lens Antennas," by Kock, Proc. I. R. E., November 1946; pages 828–836.